(12) United States Patent
Tai

(10) Patent No.: US 6,193,603 B1
(45) Date of Patent: Feb. 27, 2001

(54) WIND OUTLET PLATE OF AN AIR CONDITIONER FOR CLEANING AIR

(76) Inventor: Kuo-Cheng Tai, No. 183, Lane 226, San Lin Duan, Chung Cheng Rd., Lung-Tan Hsiang, Tao-Yuan Hsien (TW)

( * ) Notice: Subject to any disclaimer, the term of this patent is extended or adjusted under 35 U.S.C. 154(b) by 0 days.

(21) Appl. No.: 09/413,020

(22) Filed: Oct. 7, 1999

(51) Int. Cl.$^7$ ...................................................... F24F 7/00
(52) U.S. Cl. ........................ 454/300; 454/292; 454/293; 454/294
(58) Field of Search .................................. 454/292, 299, 454/300, 293, 294; 55/503, 504, 510, 511, 490; 96/58, 224

(56) References Cited

U.S. PATENT DOCUMENTS

| | | | | |
|---|---|---|---|---|
| 4,227,446 | * | 10/1980 | Sone et al. | 454/158 |
| 4,541,847 | * | 9/1985 | Oie et al. | 96/58 |
| 4,630,530 | * | 12/1986 | Eckstrom et al. | 454/100 |
| 4,896,590 | * | 1/1990 | Groos | 454/88 |
| 5,660,605 | * | 8/1997 | Chan et al. | 96/19 |

* cited by examiner

Primary Examiner—Stephen Gravini
Assistant Examiner—Jiping Lu
(74) Attorney, Agent, or Firm—Rosenberg, Klein & Lee

(57) ABSTRACT

A wind outlet plate of an air conditioner for cleaning air comprises a wind outlet panel, an upper cover, a wind guiding plate, a filter, a negative ion generator, an ultraviolet lamp. The wind outlet panel has a wind outlet. The upper cover is installed above the wind outlet panel and has respective wind inlet and wind outlet. The wind guiding plate is installed below the wind outlet panel for guiding air flow. The filter is installed on the wind guiding plate for filtering dust, and at least one rotary groove is installed at the lateral side thereof, by rotation, the rotary groove is buckled to the rotary hook at the wind inlet of the upper cover for engagement or detachment. A negative ion generator is installed at the bottom of the upper cover near the wind inlet; and an ultraviolet (UV) lamp is installed at the bottom of the upper cover near the wind inlet. By the action of the filter, negative ion generator and UV lamp, the dust can be isolated and germs are killed effectively so as to assure the cleanness of air.

11 Claims, 8 Drawing Sheets

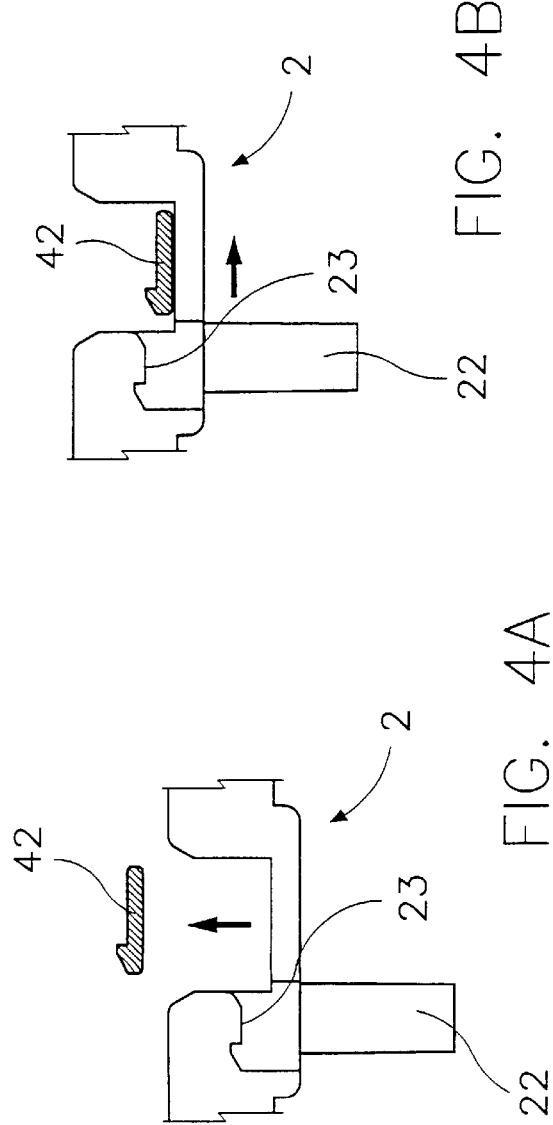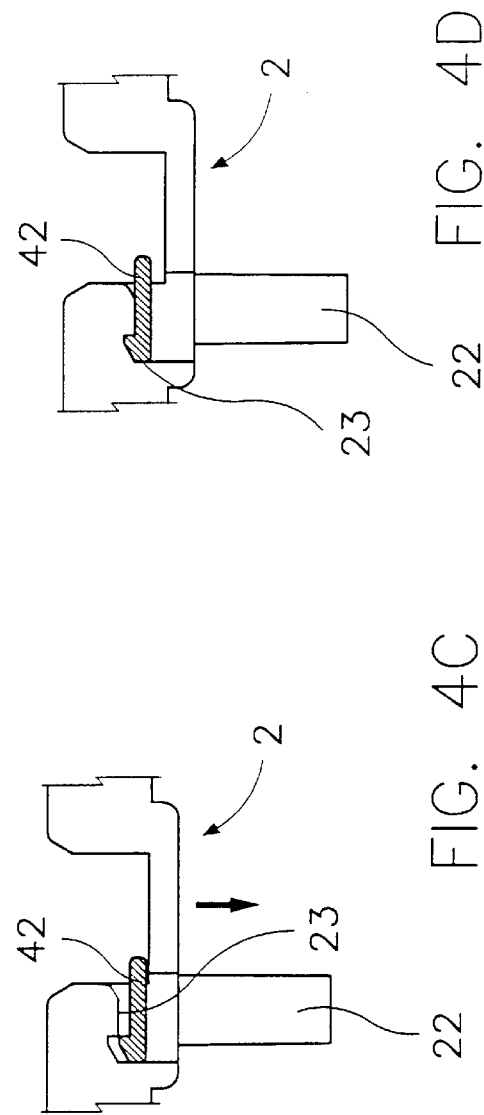

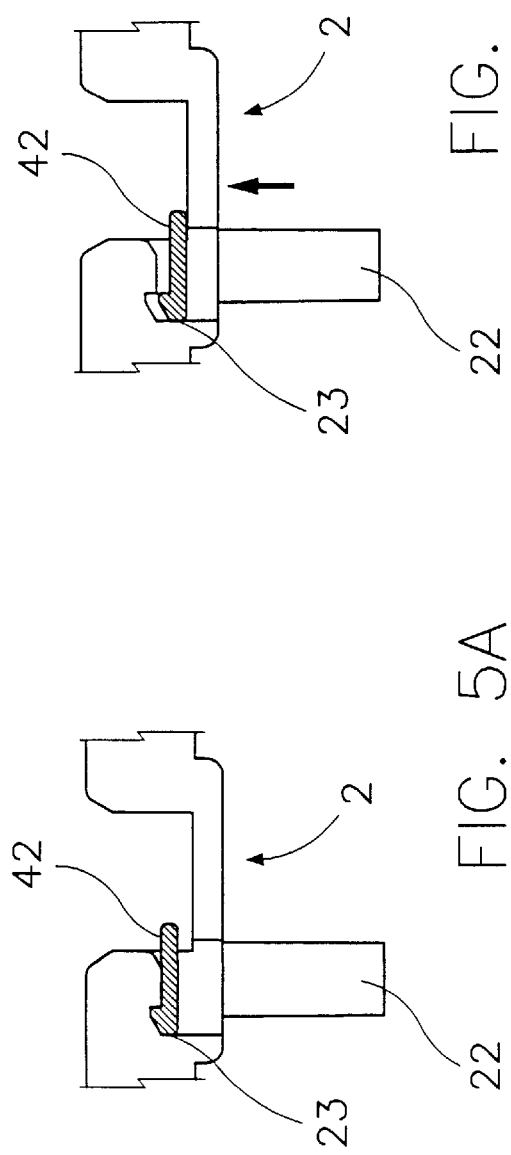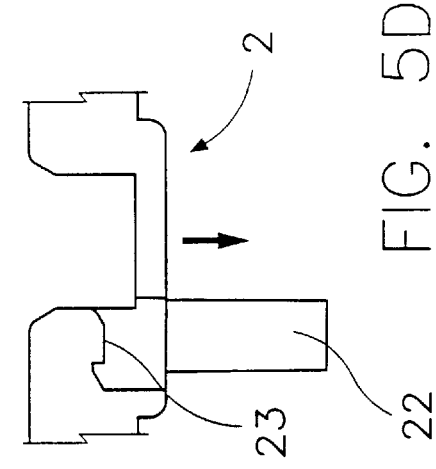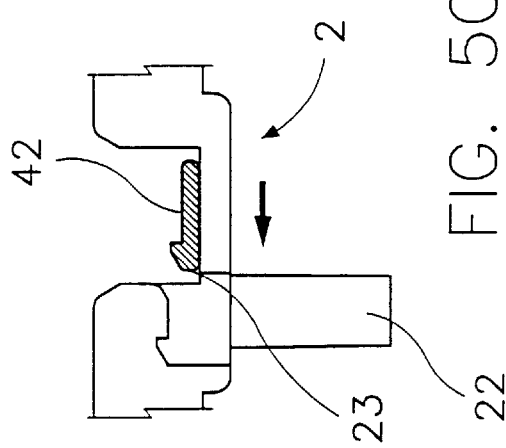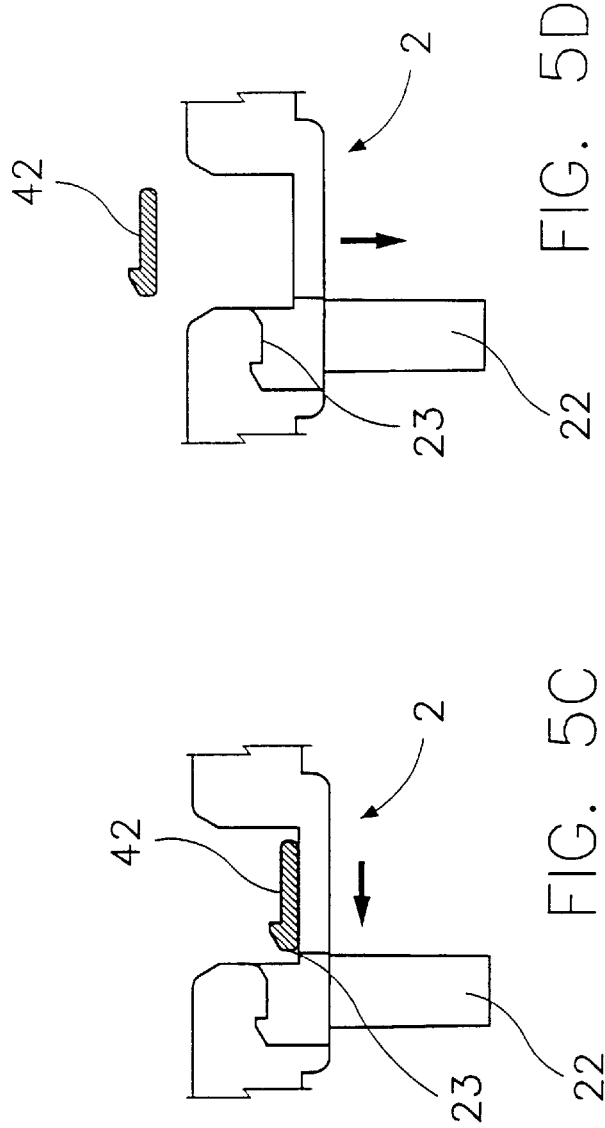

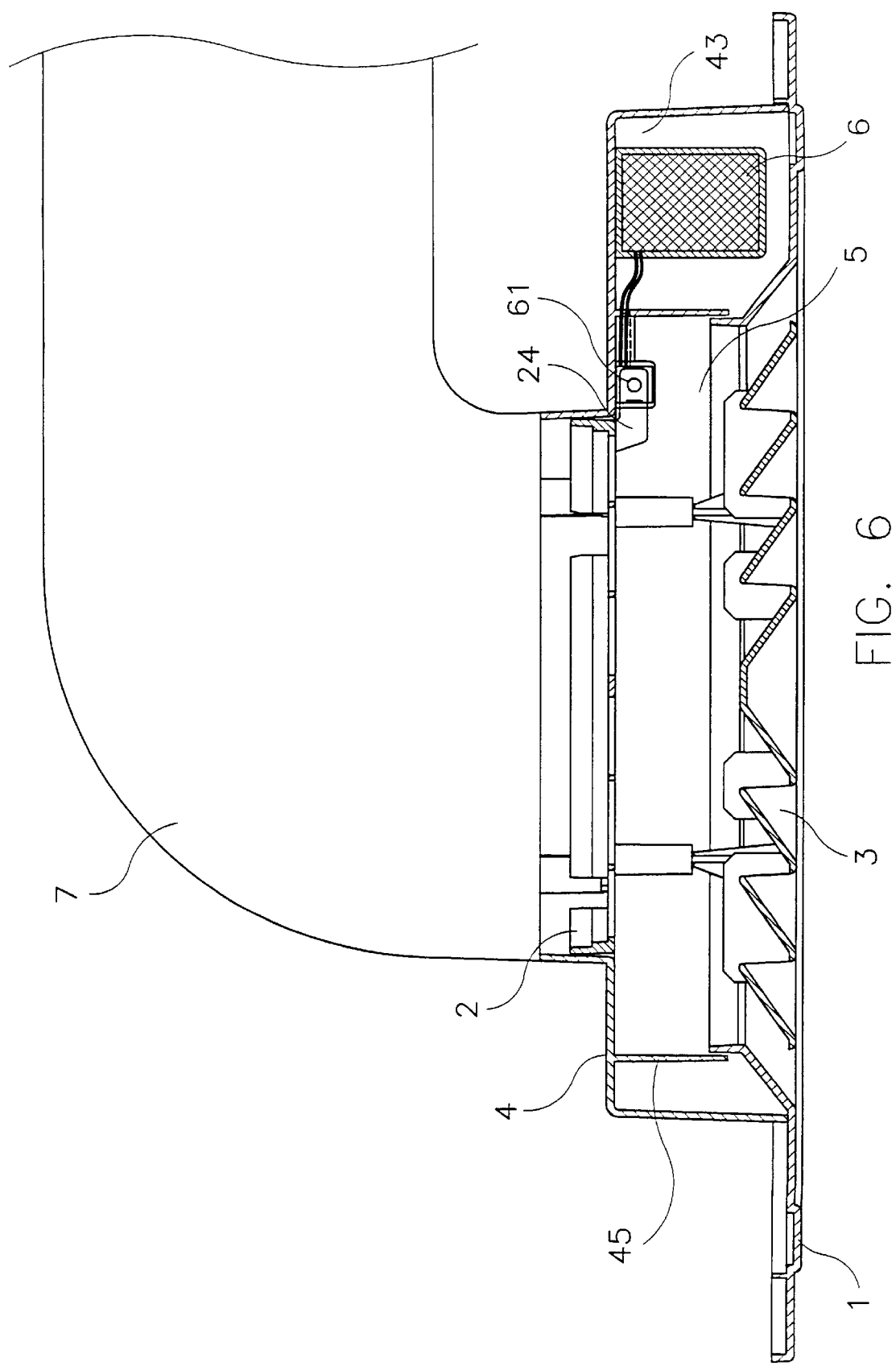

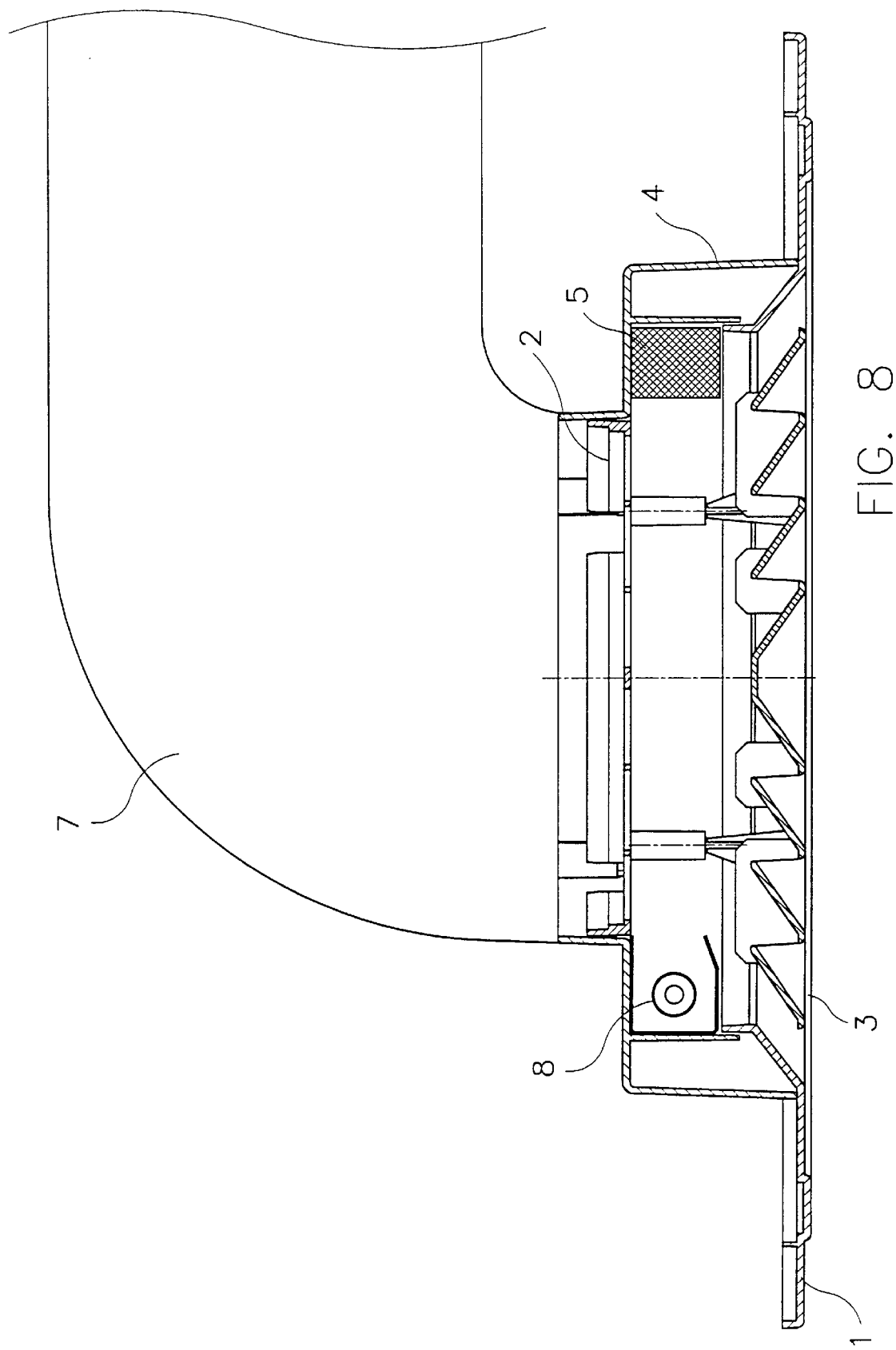

WIND OUTLET PLATE OF AN AIR CONDITIONER FOR CLEANING AIR

FIELD OF THE INVENTION

The present invention relates to a wind outlet plate of an air conditioner for cleaning air in order to increasing safety and deriving cleaning air.

BACKGROUND OF THE INVENTION

With reference to FIG. 1, an exploded view of Taiwan Patent No. 0350530 is disclosed. The wind outlet plate disclosed includes a wind outlet panel A, supports B, a bearing box C and a negative ion generator D.

Four supports B are installed at the back side of the wind outlet panel A. The supports B serve to support the bearing box C of the negative ion generator D on the wind outlet panel A.

It will be appreciated from the prior art that although the primary structure is simple, it is very difficult to detach the structure. Since the structure in the prior art has no filter. Many dusts possibly flow into a room so that the quality of air can not be assured. Moreover, since the prior art has a fixed structure, if a filter is desired to be attached thereon, the wind outlet panel is necessary to be detached. Moreover, since the negative ion generator in the prior art is controlled by a central controlled air conditioner, in order to avoid danger accidents, the air conditioner must be closed for being detached and cleaned.

Although the prior art can provide a preferred air, the maintenance and cleaning works are difficult. For example, closing the central controlled air conditioner will affect the works of other peoples. If the central controlled air conditioner is not closed, it is possible that the electric power may be drained out. Moreover, the effects in dust-proof and germ killing are poor. Therefore, it is apparently that the wind outlet panel is necessary to be improved so that it is more safer and easily detached and has the function of killing germs.

SUMMARY OF THE INVENTION

Accordingly, the object of the present invention is to provide a wind outlet plate of an air conditioner for cleaning air, wherein a safety switch is installed for safely controlling the switching of the negative ion generator. It is not only controlled by a central air conditioner, but also may be turn off automatically after the filter is detached. The safety of the workers is assured. Other then safely switching the central air conditioner and the safety switch, the remote controlled switch can be further added. Thus, three protecting devices are assured.

Another object of the present invention is to provide a wind outlet plate of an air conditioner for cleaning air, wherein a filter is added. A filtering net is installed in the filter so that dusts, dirt and other powders are filtered. Thus, the diseases about respiratory organs can be prevented. By the buckling structure of the filter in the present invention, the filter and wind guiding plate can be detached directly for cleaning air so as to retain the preferred quality of air.

A further object of the present invention is to provide a wind outlet plate of an air conditioner for cleaning air, wherein a set of ultraviolet lamps are installed for increasing the function of the negative ion generator. Therefore, germs infection through air can be killed by the negative ion generator and the UV lamps. Thus, the harmful germs in the air are reduced greatly.

The various objects and advantages of the present invention will be more readily understood from the following detailed description when read in conjunction with the appended drawing.

BRIEF DESCRIPTION OF THE DRAWINGS

FIG. 4A is a schematic view showing the wind outlet plate of an air conditioner for cleaning air according to the present invention, wherein the filtering net is buckled towards the upper cover in the first process.

FIG. 4B is a schematic view showing the wind outlet plate of an air conditioner for cleaning air according to the present invention, wherein the filtering net is buckled towards the upper cover in the second process.

FIG. 4C is a schematic view showing the wind outlet plate of an air conditioner for cleaning air according to the present invention, wherein the filtering net is buckled towards the upper cover in the third process.

FIG. 4D is a schematic view showing the wind outlet plate of an air conditioner for cleaning air according to the present invention, wherein the filtering net is buckled towards the upper cover in the fourth process.

FIG. 5A is a schematic view showing the wind outlet plate of an air conditioner for cleaning air according to the present invention, wherein the first process for detaching a filtering net from the upper cover is illustrated.

FIG. 5B is a schematic view showing the wind outlet plate of an air conditioner for cleaning air according to the present invention, wherein the second process for detaching the filtering net from the upper cover is illustrated.

FIG. 5C is a schematic view showing the wind outlet plate of an air conditioner for cleaning air according to the present invention, wherein the third process for detaching the filtering net from the upper cover is illustrated.

FIG. 5D is a schematic view showing the wind outlet plate of an air conditioner for cleaning air according to the present invention, wherein the fourth process for detaching the filtering net from the upper cover is illustrated.

FIG. 6 shows a cross sectional view of the wind outlet plate of an air conditioner for cleaning air according to the present invention.

FIG. 8 is across sectional view of the second embodiment about the wind outlet plate of an air conditioner for cleaning air in the present invention.

DETAILED DESCRIPTION OF THE PREFERRED EMBODIMENTS

Figure 1:
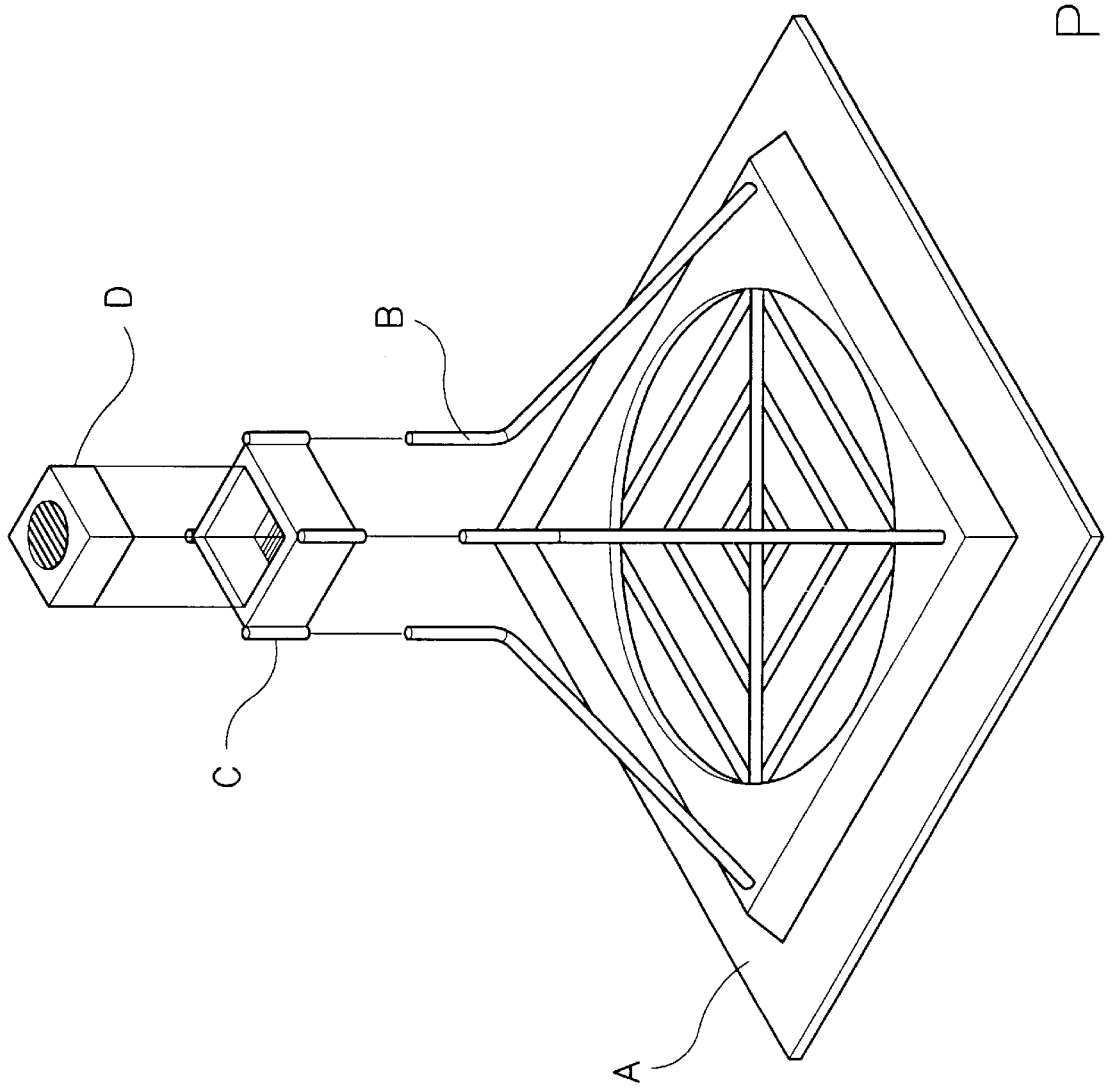
FIG. 1 is an exploded perspective view of the Taiwan Patent No. 0350530.
Figure 2:
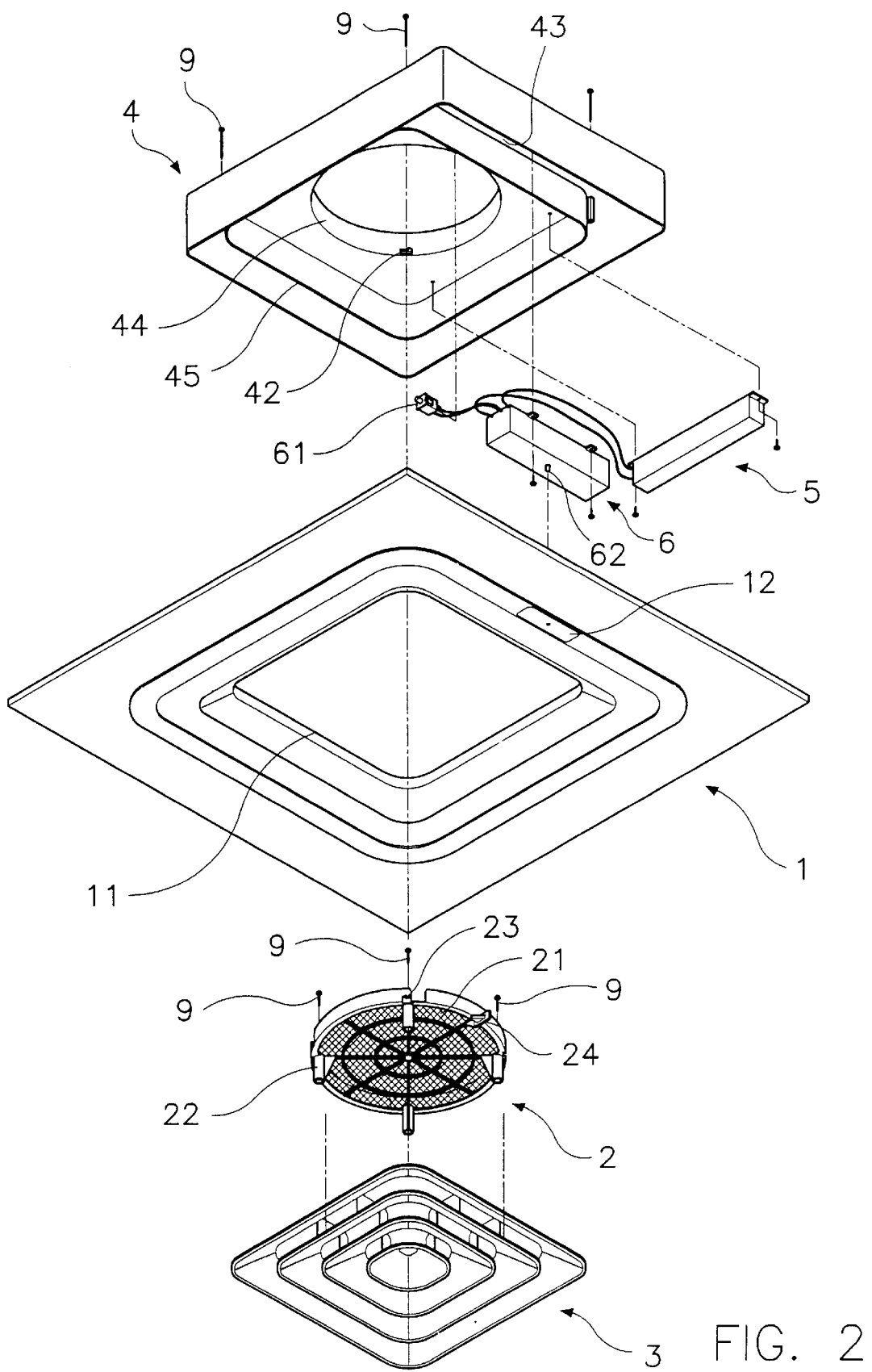
FIG. 2 is an exploded perspective view schematically showing the wind outlet plate of an air conditioner for cleaning air according to the present invention.
Figure 3:
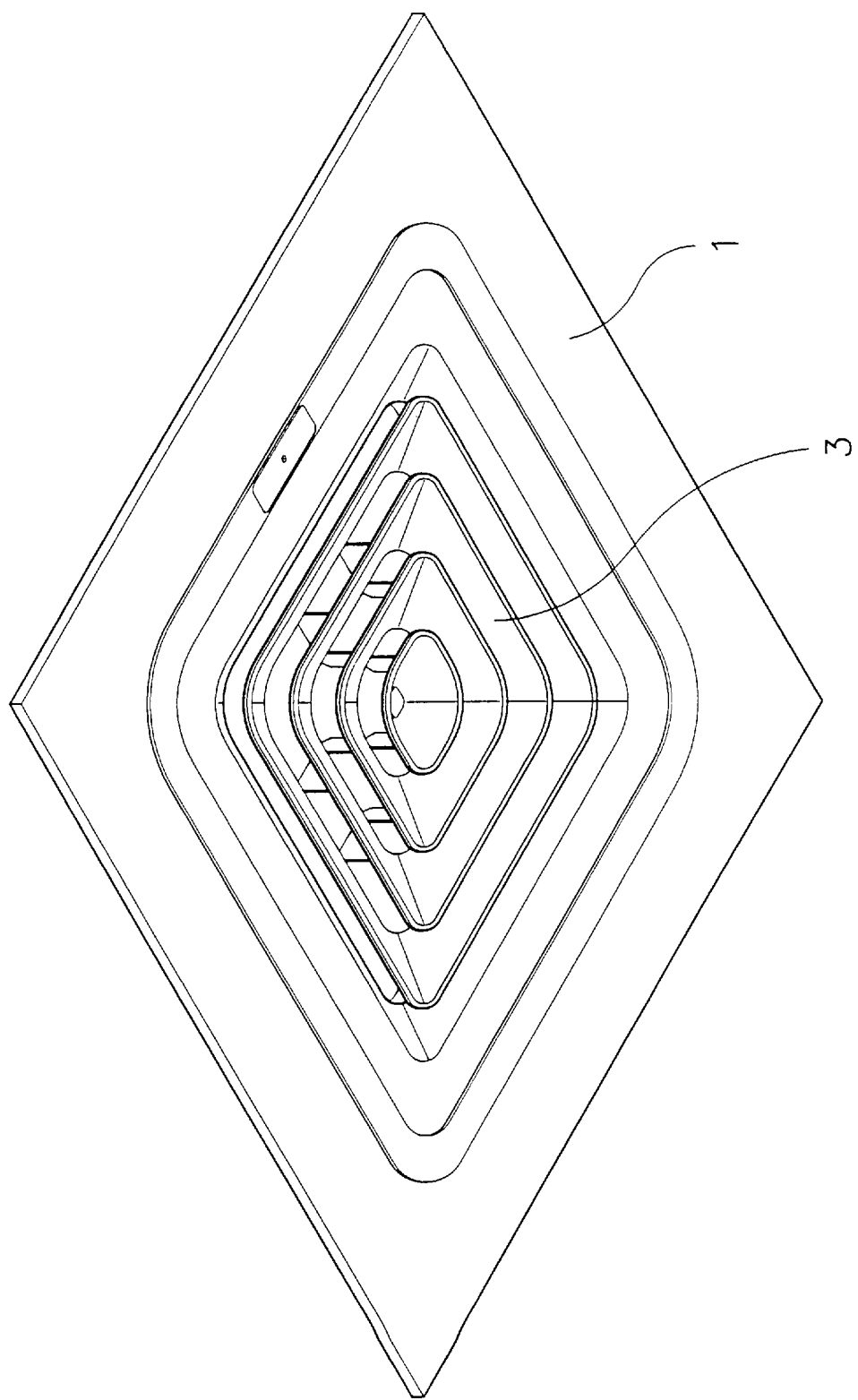
FIG. 3 is a schematic perspective view of the wind outlet plate of an air conditioner for cleaning air according to the present invention.

With reference to FIGS. 2 and 3, an exploded and assembled schematic perspective view of the wind outlet plate for cleaning air of an air conditioner according to the present invention are illustrated. The wind outlet plate of the present invention includes a wind panel 1, a filter 2, a wind guiding plate 3, an upper cover 4, a negative ion generator 5 and a power supply 6.

The wind outlet plate 1 is a plate with a wind outlet 11 one side of which is installed with a lamp display panel 12.

The filter 2 with a filtering net serves to filter dust in air. A plurality of fixing screw holes 22 are installed on the edge of the filter. A plurality of rotary grooves 23 is installed at the lateral side of the filter 2. A protrusion 24 is installed between two rotary grooves 23.

The wind guiding plate 3 is a plate for guiding air outwards.

The upper cover 4 is a mask. An wind inlet 44 is installed at the top of the upper cover 4. A frame 45 is installed within the upper cover 4. The space structure of the outer side of the frame 45 and the upper cover 4 forms as a groove 43 for receiving a power supply. A plurality of rotary hooks 42 with respect to the positions of the rotary grooves of the filter 2 are installed on the tube wall of the wind inlet.

The negative ion generator 5 generates negative ions by discharging. The generator 5 is commercially sold and thus not described in detail herein. The negative ion generator can be adhered to the upper cover 4 adjacent to the wind inlet 44 by screws.

The power supply 6 serves to supply the power and voltage to the negative ion generator 5 and is installed with a safety switch 61 and an indicator 62.

In assembly, the filter 2 is combined to the wind guiding plate 3 by the stud 9 to screw into the screw hole 22. Then, the power supply 6 is locked to the power supply receiving groove 43 of the upper cover 4. The safety switch 61 is firmly secured to the one side of wind inlet 44 of the upper cover 4. The safety switch 61 is at a position with respect to the contact piece 24 of the filter 2. The negative ion generator 5 is locked to a predetermined position in the upper cover 4. Then the upper cover 4 with the negative ion generator 5 and the power supply 6 is firmly secured to the top of the wind outlet panel 1. Now, the wind inlet 44 of the upper cover 4 is vertical to the wind outlet of the wind outlet panel 1. Whereas the indicator 62 of the power supply 6 is at an identical position of the indicator display panel 12 of the wind outlet panel 1. Finally, the filter 2 is aligned with and then inserted into the wind outlet of the wind outlet panel 1.

The engagement thereof may refer to FIG. 4A to FIG. 4D, wherein the engaging process of the filter of the wind outlet plate in the air conditioner according to the present invention is illustrated. The rotary grooves 23 of the filter 2 receive the rotary hooks 42 within the wind inlet of the upper cover 4 and then the hook rotates rightwards. Then, the filter 2 is released to be buckled with the hooks naturally. If it is desired to take down the filter, as shown in FIGS. 5A to 5D, the filter 2 is ejected upwards, then it is rotated in a reverse direction so that the rotary grooves 23 separates with the rotary hooks 42 for taking down the rotary hooks 42.

From the above structure, it may be appreciated that the safety switch 61 is at positions with respect to the contact piece 24 of the filter 2. When the filter 2 is engaged with the upper cover 4, the contact piece 24 above the filter 2 will press the safety switch 61 of the power supply 6 so as to actuate power. Thus, the negative ion generator 5 operates. While as the filter 2 separates and left from the upper cover 4, the contact piece 24 above the filter 2 will not contact with the safety switch 61 of the power supply 6, thus power is turned off. An additional remote controller may be added for controlling the power for the sake of safety.

With reference to FIG. 6, a cross sectional view of the wind outlet plate of an air conditioner for cleaning air according to the present invention is illustrated. As shown in the figure, the air from the wind outlet tube 7 will pass through the negative ion generator 5 to decompose the harmful substance in the air. Then the filtering net 21 in the filtering frame 2 serves to isolate the residue dusts.

Figure 7:
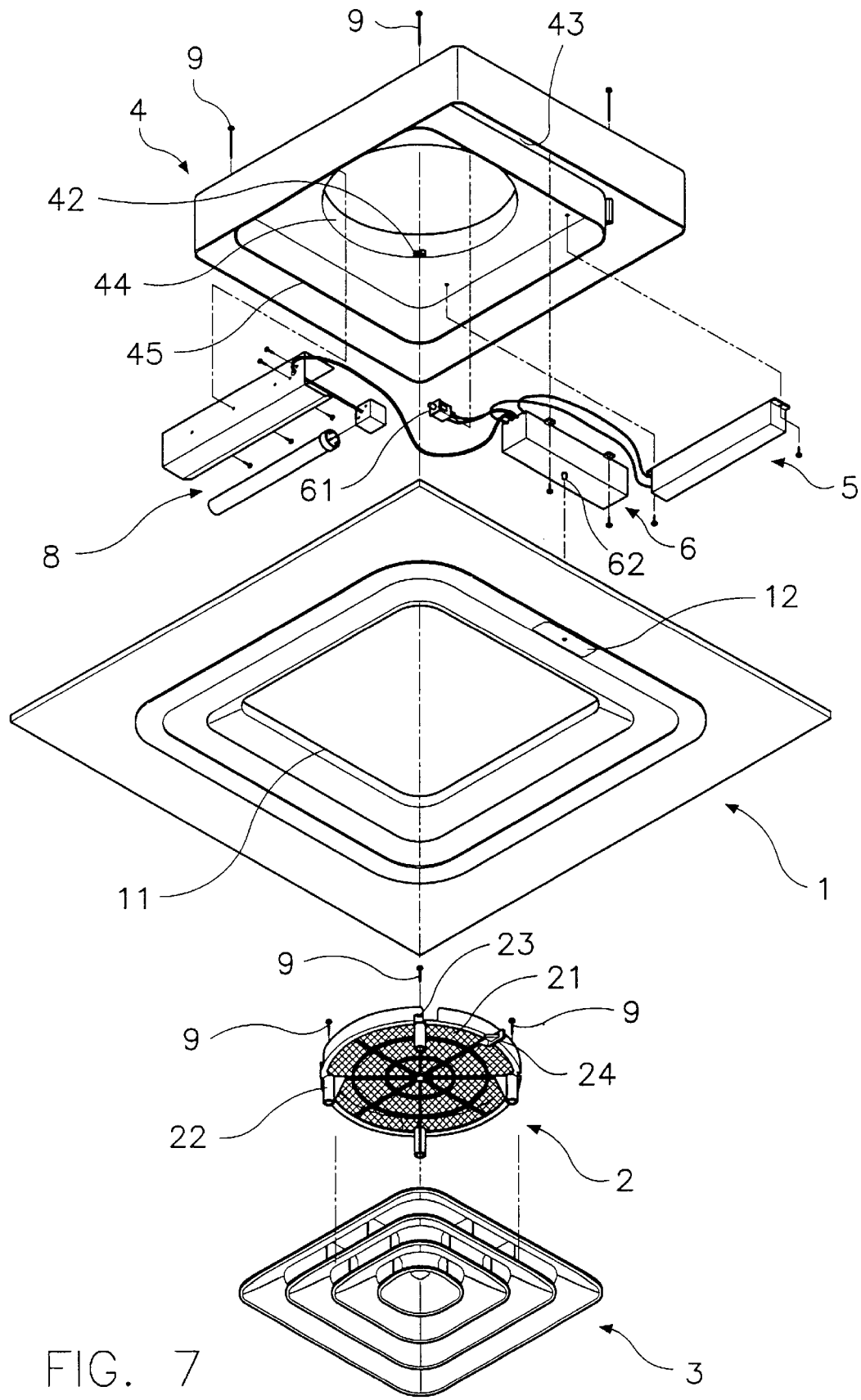
FIG. 7 is an exploded schematic view of the second embodiment of the wind outlet plate of an air conditioner for cleaning air according to the present invention.

Referring to FIGS. 7 and 8, an exploded perspective view and cross sectional view schematically showing a second embodiment of the wind outlet plate of an air conditioner for cleaning air according to the present invention are illustrated. It is illustrated that in the present invention, an ultraviolet lamp 8 can be installed in the upper cover 4 for increasing the ability for killing germs.

Therefore, the improvement of the present invention is that a safety switch 6 is added for increasing the safety. Further rotary grooves 42 within the wind inlet 44 of the upper cover 4 and the rotary grooves 23 of the filter will make the wind outlet plate be buckled conveniently. Moreover, an UV lamp serves to increase the ability to kill germs.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A purifying ventilation system for the circulated air of an air conditioner comprising:

(a) a wind outlet panel having an outer rim portion defined about a wind outlet;

(b) an upper cover coupled to an upper side of said wind outlet panel, said upper cover having formed therethrough a wind inlet axially aligned with said wind outlet, said upper cover including a frame defining a peripheral groove portion opposing said rim portion of said wind outlet panel, said upper cover including a plurality of rotary hooks protruding into said wind inlet;

(c) a wind guiding plate extending across said wind outlet of said wind outlet panel for dispersing the air flowing therethrough, said wind guiding plate;

(d) a filter coupled to said wind guiding plate and disposed within said wind inlet of said upper cover, said filter having peripherally formed therein a plurality of rotary grooves for engaging said rotary hooks of said upper cover in releasably locked manner; and, (e) a negative ion generator disposed within said peripheral groove of said upper cover.

2. The system as recited in claim 1 wherein said negative ion generator is actuable responsive to the installation of said filter within said wind inlet of said upper cover, said negative ion generator including a safety switch engaged by said filter when said filter is disposed within said wind inlet, said negative ion generator including an operational state indicator light.

3. The system as recited in claim 2 wherein said rim portion of said wind outlet panel has formed therein a lamp display panel disposed adjacent said indicator light of said negative ion generator.

4. The system as recited in claim 2 further comprising an ultraviolet lamp coupled to said upper cover adjacent said wind inlet.

5. The system as recited in claim 1 further comprising a power supply coupled to said upper cover.

6. An overhead purifying ventilation system for the circulated air of an air conditioner comprising:
   (a) a wind outlet panel having an outer rim portion defined about a wind outlet;
   (b) an upper cover coupled to an upper side of said wind outlet panel, said upper cover having formed therethrough a wind inlet axially aligned with said wind outlet, said upper cover including a frame defining a peripheral groove portion opposing said rim portion of said wind outlet panel, said upper cover including a plurality of rotary hooks protruding into said wind inlet;
   (c) a wind guiding plate extending across said wind outlet of said wind outlet panel for dispersing the air flowing therethrough, said wind guiding plate;
   (d) a filter mounted to said wind guiding plate and disposed within said wind inlet of said upper cover, said filter having peripherally formed therein a plurality of rotary grooves for engaging said rotary hooks of said upper cover in releasably locked manner;
   (e) a negative ion generator disposed within said peripheral groove of said upper cover; and,
   (f) an ultraviolet lamp coupled to said upper cover adjacent said wind inlet.

7. The system as recited in claim 6 further comprising a power supply coupled to said upper cover.

8. The system as recited in claim 7 wherein said negative ion generator is actuable responsive to the installation of said filter within said wind inlet of said upper cover, said negative ion generator including a safety switch engaged by said filter when said filter is disposed within said wind inlet, said negative ion generator including an operational state indicator light.

9. The system as recited in claim 8 wherein said rim portion of said wind outlet panel has formed therein a lamp display panel disposed adjacent said indicator light of said negative ion generator.

10. An overhead purifying ventilation system for the circulated air of an air conditioner comprising:
   (a) a wind outlet panel having an outer rim portion defined about a wind outlet;
   (b) an upper cover coupled to an upper side of said wind outlet panel, said upper cover having formed therethrough a wind inlet axially aligned with said wind outlet, said upper cover including a frame defining a peripheral groove portion opposing said rim portion of said wind outlet panel, said upper cover including a plurality of rotary hooks protruding into said wind inlet;
   (c) a wind guiding plate extending across said wind outlet of said wind outlet panel for dispersing the air flowing therethrough, said wind guiding plate;
   (d) a filter mounted to said wind guiding plate and disposed within said wind inlet of said upper cover, said filter having peripherally formed therein a plurality of rotary grooves for engaging said rotary hooks of said upper cover in releasably locked manner, said filter being supported by and suspended from said upper cover;
   (e) a negative ion generator disposed within said peripheral groove of said upper cover, said negative ion generator is actuable responsive to the installation of said filter within said wind inlet of said upper cover, said negative ion generator including a safety switch engaged by said filter when said filter is disposed within said wind inlet;
   (f) an ultraviolet lamp coupled to said upper cover adjacent said wind inlet; and,
   (g) a power supply coupled to said upper cover for powering said negative ion generator and said ultraviolet lamp.

11. The system as recited in claim 10 wherein said negative ion generator includes an operational state indicator light, and said rim portion of said wind outlet panel has formed therein a lamp display panel disposed adjacent said indicator light of said negative ion generator.

* * * * *